United States Patent [19]

Larsson et al.

[11] Patent Number: 5,759,397
[45] Date of Patent: Jun. 2, 1998

[54] FILTER WITH SPRAY CAKE REMOVAL MEANS

[75] Inventors: Per Helge Larsson; Jonas Hans Olov Nordlöf, both of Avesta, Sweden

[73] Assignee: Caustec AB, Sweden

[21] Appl. No.: 338,460

[22] PCT Filed: May 3, 1993

[86] PCT No.: PCT/SE93/00385

§ 371 Date: Mar. 8, 1995

§ 102(e) Date: Mar. 8, 1995

[87] PCT Pub. No.: WO93/23140

PCT Pub. Date: Nov. 25, 1993

[30] Foreign Application Priority Data

May 15, 1992 [SE] Sweden .................. 9201541

[51] Int. Cl.[6] .................. B01D 33/06; B01D 33/00
[52] U.S. Cl. .................. 210/331; 210/391; 210/396; 210/402; 210/406; 210/408; 210/409; 210/417
[58] Field of Search .................. 210/331, 332, 210/340, 391, 396, 402, 406, 407, 408, 409, 417

[56] References Cited

U.S. PATENT DOCUMENTS

| | | |
|---|---|---|
| 1,804,934 | 5/1931 | Hoyt . |
| 2,839,194 | 6/1958 | Lopker et al. . |
| 3,169,706 | 2/1965 | Ross . |
| 3,521,751 | 7/1970 | Holthuis . |
| 4,995,991 | 2/1991 | Ljokkoi et al. .................. 210/331 |
| 5,374,360 | 12/1994 | Weis .................. 210/331 |
| 5,423,977 | 6/1995 | Aoki et al. . |
| 5,470,472 | 11/1995 | Baird et al. .................. 210/391 |

FOREIGN PATENT DOCUMENTS

| | | |
|---|---|---|
| 0454392A1 | 10/1991 | European Pat. Off. . |
| 454392 | 10/1991 | European Pat. Off. . |
| 1619882 | 2/1971 | Germany . |
| 3047539 | 7/1982 | Germany . |

OTHER PUBLICATIONS

C.F. Cornell, "Current Recausticizing Practice, Part 1; 1992 Kraft Recovery Operations Short Course (Orlando)", pp. 29–57.

Primary Examiner—Robert Popovics
Attorney, Agent, or Firm—Dorsey & Whitney LLP

[57] ABSTRACT

In a rotatable filter, such as a disk filter, for separating solid particles from a liquid mixture, in which a filter material (3) is partially immersed, a cake-removal member (11) is designed to take off a layer of the formed cake of solid particles from the filter material, so that a liquid-permeable coating, which itself acts as a filter medium, is left on the filter material which is moved down into the liquid mixture which is to be separated. According to the invention, for renewing the coating a spraying apparatus (13–17) is designed to spray jets of liquid in at least one spray zone (18), through which only a part of the filter material passes upwards during the rotating movement of the filter material, so that the whole cake of coarse particles, including the coating, is removed from the part of the filter material by the jets of liquid.

23 Claims, 3 Drawing Sheets

FILTER WITH SPRAY CAKE REMOVAL MEANS

BACKGROUND OF THE INVENTION

1. Field of the Invention

The present invention relates to an arrangement for separating solid particles from a liquid mixture, comprising a hollow filter body with a wall of filter material, and a container for the liquid mixture which is to be separated, the filter body being arranged partially immersed in the liquid mixture. A drive member is designed to rotate the filter body about a horizontal axle, so that the wall of filter material is rotated up and down through the surface of the liquid mixture. A pressure source is designed to generate a higher pressure on the outside of the filter body than on the inside of the filter body, so that a fine fraction of the liquid mixture is forced through the filter material, while a cake of solid particles is deposited on the filter material and accompanies the latter up over the liquid mixture during rotation of the filter body. A cake-removal member is designed to take off a layer of the cake from the filter material above the liquid mixture, so that a liquid-permeable coating of solid particles is left on the filter material which is moved down into the liquid mixture during rotation of the filter body. The arrangement moreover comprises a discharging member for discharging the said removed cake layer from the arrangement, and means for spraying the filter material with jets of liquid above the liquid mixture for the purpose of removing the said coating of solid particles for renewal thereof.

2. Description of the Prior Art

Arrangements of this type are used in the paper pulp industry, especially for purifying white liquor, green liquor and lime sludge (calcium carbonate) in causticization processes.

The renewal of the said coating of solid particles is necessary due to the fact that the liquid-permeability of the coating deteriorates after a certain running period. In a known arrangement of this type, which consists of a drum filter for purifying lime sludge, the coating of solid particles is renewed by the spraying means removing a strip of the coating from the filter drum. A jet of liquid from the spraying means is in this case moved to and fro axially along the filter drum on its down side and between the cake-removal member and the liquid mixture. A disadvantage of the known arrangement is that the spraying means must be designed to spray the jet of liquid at a high pressure in order to guarantee to some extent the removal of the coating, since the coating is especially dry and hard between the cake-removal member and the liquid mixture. In practice, the spraying means has to be designed to generate two continuously movable jets of liquid, a first jet of liquid for crushing and breaking up the coating, and a second jet of liquid for finally cleaning the filter drum surface thus exposed. Despite the use of the said two jets of liquid, the removal of the coating is not entirely reliable.

SUMMARY OF THE INVENTION

The aim of the present invention is to provide an arrangement of the type in question here, by means of which the renewal of the said coating of solid particles can be effected with the aid of a single spraying means in a reliable manner.

This aim is achieved by means of an arrangement of the type described in the introduction, which is distinguished essentially in that the spraying means is designed to spray jets of liquid in at least one spray zone, through which a part of the wall of filter material passes upwards during rotation of the filter body, so that the whole cake of coarse particles, including the coating, is removed from the wall part of filter material by the jets of liquid when the spraying means is actuated during rotation of the filter body.

Thus, the spraying means will spray jets of liquid on the part of the cake which is being moved upwards from the liquid mixture and which, including the coating under the cake, is relatively wet and porous, which affords the advantage that the wet, porous coating is easily removed from the filter material by the jets of liquid.

The spray zone is preferably arranged in proximity to the surface of the liquid mixture, the spraying means being designed to direct the jets of liquid essentially downwards towards the filter material. This means that the jets of liquid impact the wettest, most easily removed part of the cake and cast it back down into the liquid mixture.

The spraying means is expediently designed to move the spray zone continuously or in stages essentially horizontally along the filter material during rotation of the filter body. Alternatively, the spraying means can comprise a number of stationary spraying members designed to spray jets of liquid in respective spray zones, through which parts of the wall of filter material pass during rotation of the filter body, the spray zones being distributed essentially horizontally along the wall of filter material. In this case it is expedient for at least one of the spraying members to be capable of being actuated independently of the rest.

According to a preferred embodiment of the arrangement according to the invention, the hollow filter body consists of at least one annular disk with two side walls of filter material arranged at a distance from one another. The disk is coaxial to and rotatable about the horizontal axle, the spraying means being designed to spray jets of liquid towards that part of each side wall which is being moved upwards during rotation of the disk. In this case, the spraying means comprises spraying members which are pivotable about a further horizontal axle situated radially outside the disk.

The hollow filter body preferably consists of a number of disks, at least one of the spraying members being actuable independently of the remaining spraying members. If, for example, all the spraying members can be actuated independently of the rest, this affords the advantage that the coating can be renewed on one disk at a time, which means that the differential pressure over the filter material of the disks is affected only marginally.

Alternatively, the hollow filter body can consist of a horizontal drum with a circumferential wall of filter material, which drum is coaxial to and rotatable about the said horizontal axle, the spraying means being designed to spray jets of liquid towards that part of the circumferential wall which is being moved upwards during rotation of the drum.

BRIEF DESCRIPTION OF THE DRAWINGS

The invention is described in greater detail hereinbelow with reference to the attached drawings, in which.

DESCRIPTION OF THE PREFERRED EMBODIMENTS

Figure 1:
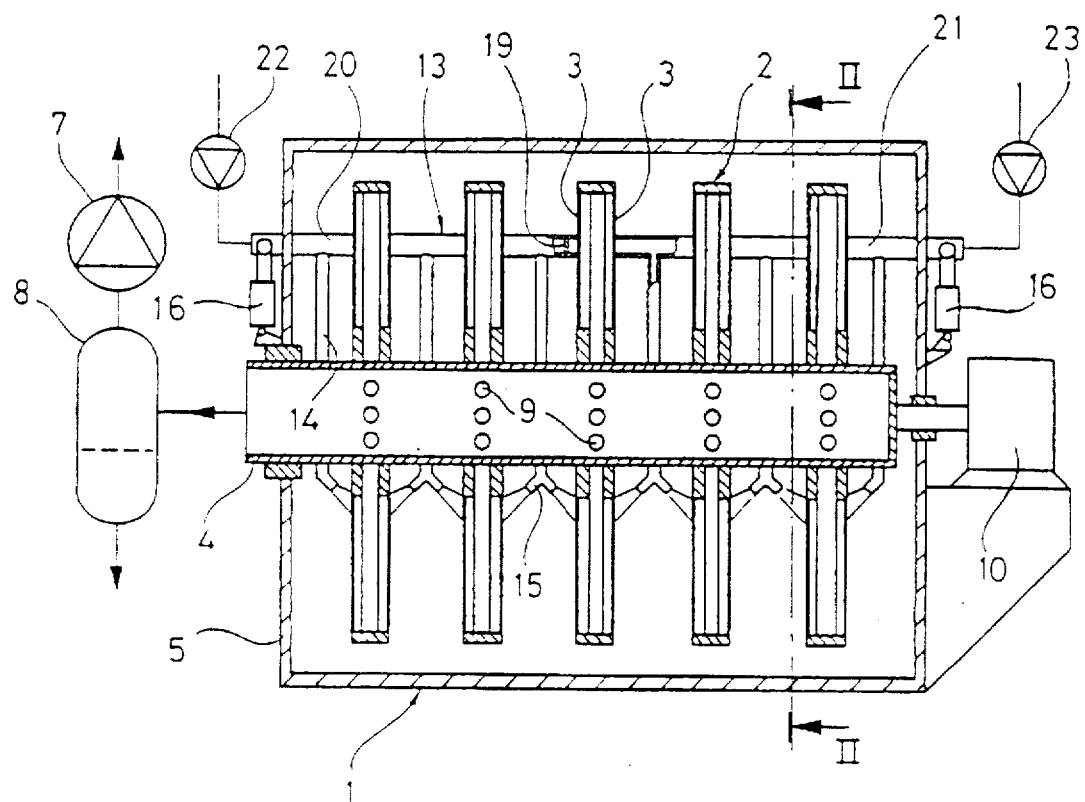
FIG. 1 shows a view of a longitudinal section through a preferred embodiment of the arrangement according to the invention.
Figure 2:
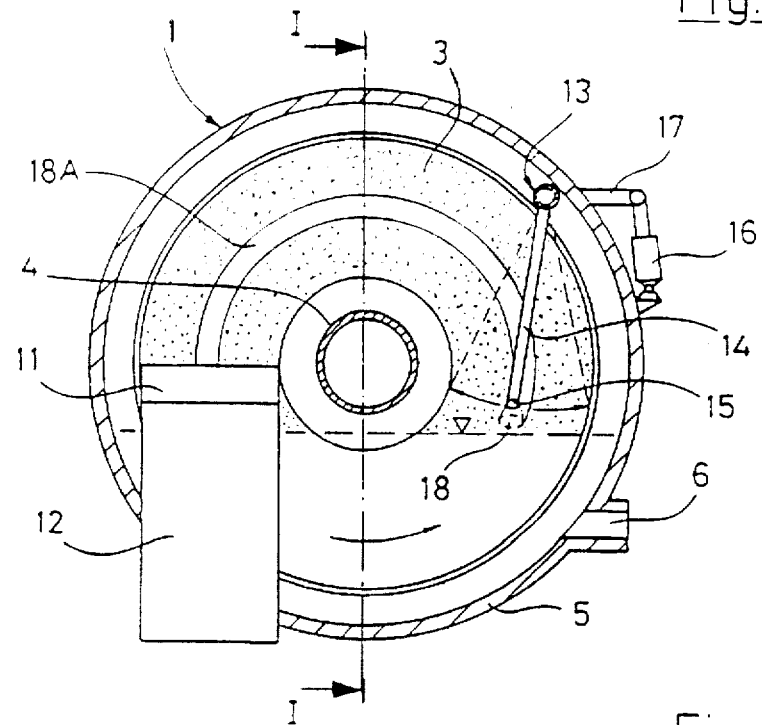
FIG. 2 shows a view of a cross-section through the embodiment according to FIG. 1.

The arrangement 1 shown in FIGS. 1 and 2 comprises five circular annular hollow disks 2 with side walls 3 of filter material, a tubular horizontal axle 4, on which the disks 2 are arranged at a distance from one another and coaxially to the axle 4, and a container 5 in which the axle 4 is rotatably mounted. The container 5 is provided with an inlet 6 for admission of the liquid mixture which is to be separated. A pressure source in the form of a vacuum pump 7 is connected via a filter separator 8 to the inside of the tubular axle 4, which communicates with the inside of the disks 2 via holes 9 in the circumferential wall of the axle 4.

A driving motor 10 is designed to turn the axle 4 counterclockwise as viewed in FIG. 2. A cake-removal member in the form of stationary horizontal scrapers 11, arranged on respective side walls 3, is designed to scrape off layers of formed cakes from those parts of the side walls 3 which are moved downwards towards the liquid mixture, when the driving motor 10 turns the axle 4. Under each scraper 11 there is a discharging member in the form of a shaft 12 for discharging the removed cake layers.

A distribution pipe 13 for water extends parallel to the axle 4 past the disks 2 and is pivotably mounted in the container 5. From the distribution pipe 13, six spray pipes 14 extend along the side walls 3 of the disks 2 to the vicinity of the liquid mixture. At the free end of each spray pipe 14 there is a spray nozzle 15, which is designed to direct a jet of water essentially downwards to that part of the filter material which is moved upwards when the driving motor 10 turns the axle 4. Two hydraulic piston members 16 are arranged to turn the distribution pipe 13 to and fro via arms 17, which are rigidly secured on the distribution pipe 13, so that the spray nozzles 15 are moved between the radially outer and inner diameters of the side walls. Each spray nozzle 15 is designed to spray a jet of water in a spray zone 18, through which only a part of the side wall 3 of the associated disk 2 passes when the disk 2 is rotated.

The distribution pipe 13 is provided with an inner partition wall 19, which divides the distribution pipe 13 into two sections 20 and 21. The one-section 20 is designed to distribute water to the spray nozzles 15 of the three left-hand spray pipes 14 illustrated in FIG. 1, while the second section 21 is designed to distribute water to the three right-hand spray pipes 14 illustrated in FIG. 1. Two pumps 22, 23 are designed to pump water to respective sections 20, 21 of the distribution pipe 13.

During operation, the scrapers 11 continuously scrape off layers of formed cakes from the side walls 3 of the disks 2, so that a coating of particles acting as a filter medium is left on the filter material, when the latter is moved down into the liquid mixture. When the coating is to be renewed, first the pump 22 and the piston members 16 are actuated so that each spray nozzle 15 of the three left-hand spray pipes 14 illustrated in FIG. 1 spray off a narrow strip of the cake, including the coating, from the filter material. FIG. 2 indicates how such a removed strip of cake gives rise to a cake-free narrow zone 18a on the filter material above the liquid mixture.

When the spray nozzles 15 have been moved between the radially outer and inner diameters of the side walls 3, which can be carried out in stages or continuously, so that the whole coating of solid particles has been renewed, the pump 22 is stopped and the pump 23 is actuated. Thereafter, the procedure described above (for renewal of the coating) is repeated for those disks 2 which are served by the spray nozzles 15 of the three right-hand spray pipes 14 illustrated in FIG. 1.

Since the renewal of the coating takes place simultaneously in only half of the disks 2, and only a small part of the filter material is without coating during the renewal thereof, the necessary pressure difference between the sides of the filter material can be maintained during the renewal procedure. The normal operation of the arrangement is therefore not affected during the renewal of the coating.

Figure 3:
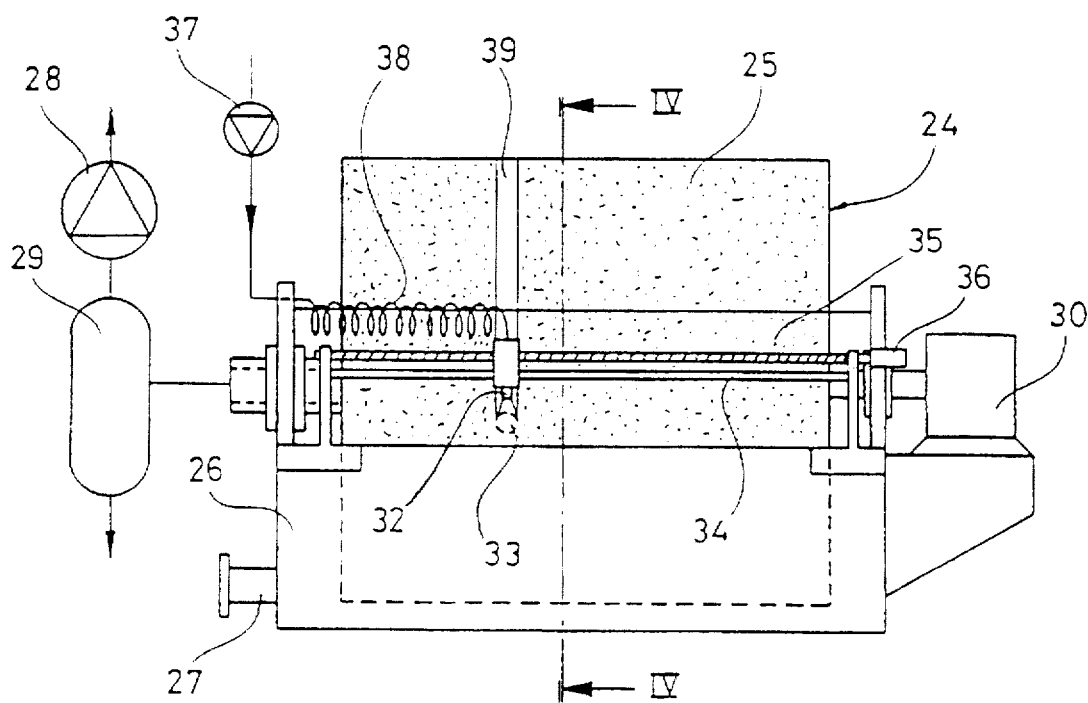
FIG. 3 shows a view of a longitudinal section through another embodiment of the arrangement according to the invention.
Figure 4:
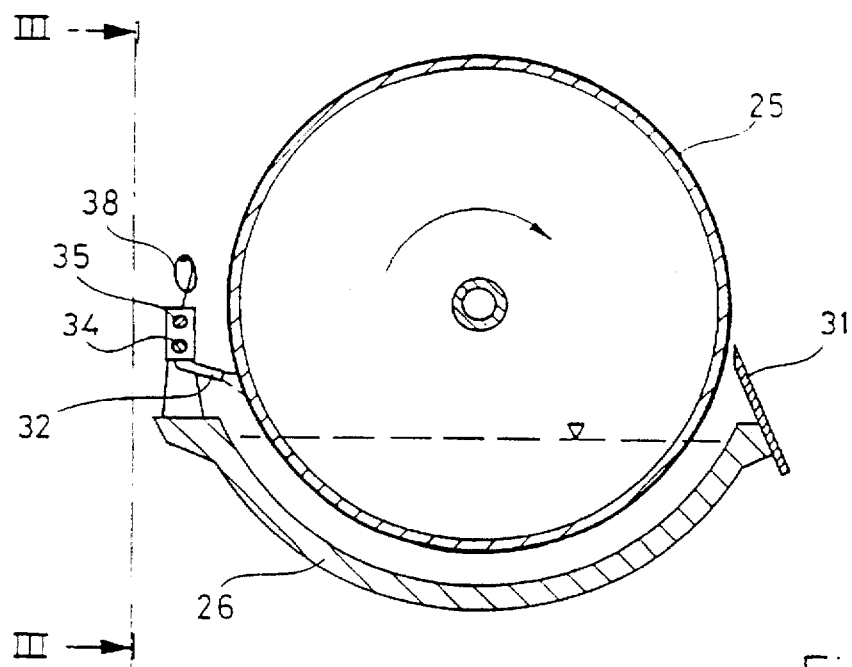
FIG. 4 shows a view of a cross-section along the line IV—IV in FIG. 3.

The arrangement illustrated in FIGS. 3 and 4 comprises a horizontal circular drum 24 with a circumferential wall 25 of filter material, and a container 26 in which the drum 24 is rotatably mounted. The container 26 is provided with an inlet 27 for admission of the liquid mixture which is to be separated. A vacuum pump 28 is connected to the inside of the drum 24 via a filtrate separator 29. A driving motor 30 is designed to turn the drum 24 clockwise, as viewed in FIG. 4. A stationary scraper 31 is designed to scrape off a layer of formed cake from that part of the circumferential wall 25 which is moved downwards towards the liquid mixture when the driving motor 30 turns the drum 24.

On that side of the circumferential wall 25 which is moved upwards when the driving motor 30 turns the drum 24, a spray nozzle 32 is situated in proximity to the liquid mixture and is designed to spray a jet of water in a spray zone 33, through which only a part of the circumferential wall 25 passes when the drum 24 is turned. The spray nozzle 32 is slideably arranged on a horizontal rail 34, which extends along the whole circumferential wall 25. A screw 35, which extends parallel to the rail 34 and is rotatably mounted in the container 26, is in threaded engagement with the spray nozzle 32. A driving motor 36 is coupled to the screw 35 and is designed to turn it so that the spray nozzle 32 is moved on the rail 34 along the circumferential wall 25. A pump 37 is designed to pump water via a tubing 38 to the spray nozzle 32.

When the coating of solid particles, acting as filter medium, on the circumferential wall 25 is to be renewed, the pump 37 is actuated so that the spray nozzle 32 sprays off a narrow strip of the cake, including the coating, from the circumferential wall 25 of filter material. FIG. 3 indicates how the strip of cake removed by spraying gives rise to a narrow cake-free zone 39 on the filter material above the liquid mixture. The whole coating of solid particles on the circumferential wall 25 is renewed by means of the driving motor 36 being actuated, so that the spray nozzle 32 is moved continuously or in stages along the whole circumferential wall 25.

Figure 5:
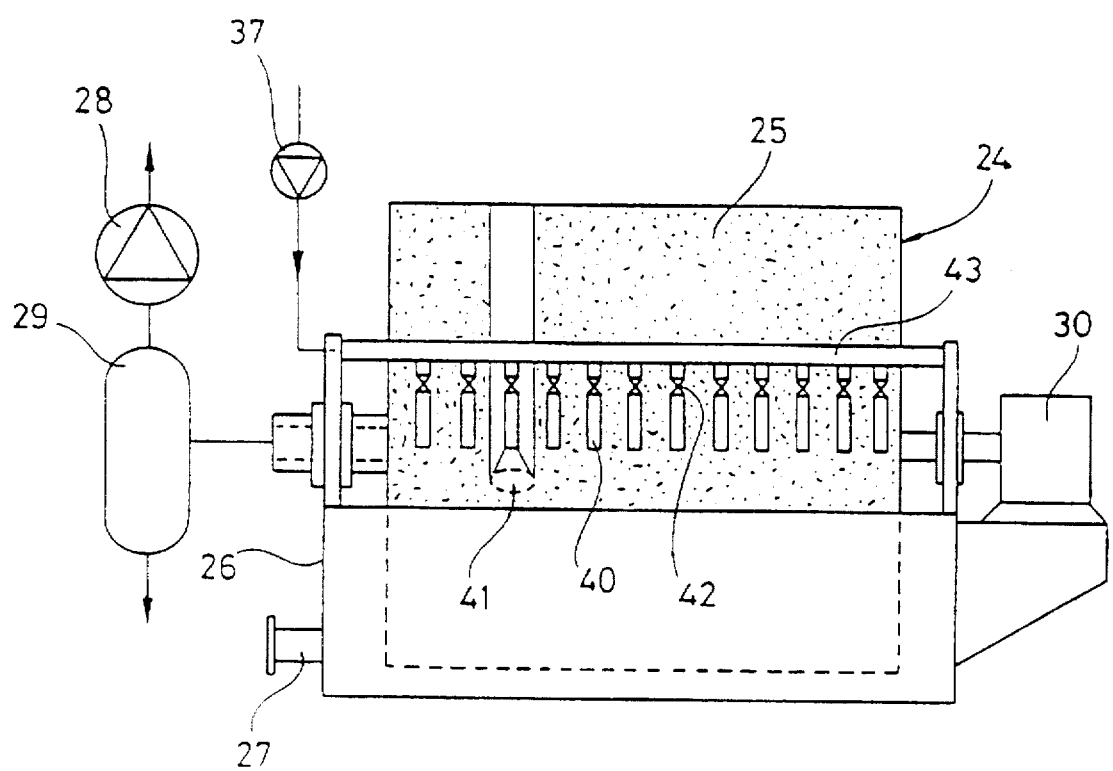
FIG. 5 shows a modification of the embodiment according to FIG. 3.

The modified arrangement illustrated in FIG. 5 is identical to the arrangement according to FIGS. 3 and 4, except for the setup for renewal of the coating of solid particles acting as a filter medium. In this case, a large number of stationary spray nozzles 40 are arranged in a row along the circumferential wall 25 and are designed to spray jets of water in respective spray zones 41, through which parts of the circumferential wall pass during rotation of the drum 24. Each spray nozzle 40 is connected via a valve 42 to a distribution pipe 43, which in turn is connected to the pump 37.

The valves 42 are adjustable independently of one another, which means that optically one narrow strip of cake, or several such strips together, can be sprayed off from the circumferential wall 25. For example, the spray nozzles 40 can be actuated by means of the valves 42 one after another along the row of spray nozzles 40.

The pumps 22, 23 and 37 are dimensioned so as to generate a relatively moderate impact pressure for the jet of water from each nozzle 15, 32, 40. It has been found that a pressure for the jet of water of between 5–30 bar, preferably 15 bar, is sufficient to ensure the removal of the formed cake from the filter material.

We claim:

1. An apparatus for separating solid particles from a liquid mixture in a causticization process, comprising a hollow filter body (2, 24) with a wall (3, 25) of filter material, a container (5, 26) for the liquid mixture which is to be separated, the filter body being arranged partially immersed in the liquid mixture, a drive member means (10, 30) for rotating the filter body about a horizontal axle, so that the wall of filter material is rotated up and down through a surface of the liquid mixture, means (7, 28) for generating a higher pressure outside than inside of the filter body so that a filtrate of the liquid mixture is forced through the filter material, while a cake of solid particles is deposited on the filter material so as to be brought up over the liquid mixture during rotation of the filter body, a cake-removal member means (11, 31) for taking off a layer of the cake from the filter material above the liquid mixture, so that a liquid-permeable coating of solid particles is left on the filter material which is moved down into the liquid mixture during rotation of the filter body, a discharging member means (12) for discharging said removed cake layer from the apparatus, and means (13–17; 22, 23; 32, 34–38; 40–43) for spraying off a strip of the filter material with jets of liquid for the purpose of removing said coating of solid particles for renewal of the coating, wherein said spraying means (13–17; 22; 23; 32, 34–38; 40–43) sprays jets of liquid in at least one spray zone (18; 33; 41) above the liquid mixture, through which a part of the wall (3, 25) of filter material passes upwards during rotation of the filter body (2, 24), and that the spraying means is arranged such that a narrow strip of the cake of coarse particles, including said coating, is removed from said wall part of filter material by said jets of liquid, when the spraying means is actuated during rotation of the filter body.

2. An apparatus according to claim 1, wherein the spray zone (18; 43; 41) is arranged in proximity to the surface of the liquid mixture.

3. An apparatus according to claim 1, wherein the spraying means (13–17, 22, 23; 32, 34–38; 40–43) directs the jets of liquid essentially downwards towards the filter material.

4. An apparatus according to any one of claims 1–3, wherein the spraying means (13–17, 22, 23; 32, 34–38) continuously moves the said spray zone (18; 33) essentially horizontally along the filter material during rotation of the filter body (2, 24).

5. An apparatus according to any one of claims 1–3, wherein the spraying means (13–17, 22, 23; 32, 34–38) moves said spray zone (18; 33) in stages essentially horizontally along the filter material during rotation of the filter body.

6. An apparatus according to any one of claims 1–3, wherein the spraying means comprises a number of stationary spraying members (40).

7. An apparatus according to claim 6, wherein at least one of the spraying members (40) can be actuated independently of the remaining spraying members.

8. An apparatus for separating solid particles from a liquid mixture in a causticization process, comprising a hollow filter body (2, 24) with a wall (3, 25) of filter material, a container (5, 26) for the liquid mixture which is to be separated, the filter body being arranged partially immersed in the liquid mixture, a drive member means (10, 30) for rotating the filter body about a horizontal axle, so that the wall of filter material is rotated up and down through a surface of the liquid mixture, means (7, 28) for generating a higher pressure outside than inside of the filter body so that a filtrate of the liquid mixture is forced through the filter material, while a cake of solid particles is deposited on the filter material so as to be brought up over the liquid mixture during rotation of the filter body, a cake-removal member means (11, 31) for taking off a layer of the cake from the filter material above the liquid mixture, so that a liquid-permeable coating of solid particles is left on the filter material which is moved down into the liquid mixture during rotation of the filter body, a discharging member means (12) of discharging said removed cake layer from the apparatus, and means (13–17; 22, 23; 32, 34–38; 40–43) for spraying off a strip of the filter material with jets of liquid for the purpose of removing said coating of solid particles for renewal of the coating, wherein said spraying means (13–17, 22, 23; 32, 34–38; 40–43) sprays jets of liquid in at least one spray zone (18; 33; 41) above the liquid mixture, through which a part of the wall (3, 25) of filter material passes upwards during rotation of the filter body (2, 24), and that the spraying means is arranged such that a narrow strip of the cake of coarse particles, including said coating, is removed from said wall part of filter material by said jets of liquid, when the spraying means is actuated during rotation of the filter body, wherein the hollow filter body consists of a horizontal drum (24) with a circumferential wall (25) of filter material, which drum is coaxial to and rotatable about said horizontal axle, the spraying means (32, 34–38; 40–43) sprays jets of liquid towards that part of the circumferential wall which is being moved upwards during rotation of the drum.

9. An apparatus according to claim 8, wherein the spray zone (18; 43; 41) is arranged in proximity to the surface of the liquid mixture.

10. An apparatus according to claim 8, wherein the spraying means (13–17, 22, 23; 32, 34–38; 40–43) directs the jets of liquid essentially downwards towards the filter material.

11. An apparatus according to any one of the claims 8, 9 and 10, wherein the spraying means (13–17, 22, 23; 32, 34–38) continuously moves said spray zone (18; 33) essentially horizontally along the filter material during rotation of the filter body (2, 24).

12. An apparatus according to any one of claims 8, 9 and 10, wherein the spraying means (13–17, 22, 23; 32, 34–38) moves said spray zone (18; 33) in stages essentially horizontally along the filter material during rotation of the filter body.

13. An apparatus according to any one of claims 8, 9 and 10, wherein the spraying means comprises a number of stationary spraying members (40) which spray jets of liquid in respective spray zones (41), through which parts of the wall (25) of filter material pass during rotation of the filter body (24), the spray zones being distributed essentially horizontally along the wall of filter material.

14. An apparatus according to claim 13, wherein at least one of the spraying members (40) can be actuated independently of the remaining spraying members.

15. Arrangement for separating solid particles from a liquid mixture, comprising a hollow filter body (2, 24) with a wall (3, 25) of filter material, a container (5, 26) for the liquid mixture which is to be separated, the filter body being arranged partially immersed in the liquid mixture, a drive member (10, 30) being designed to rotate the filter body about a horizontal axle, so that the wall of filter material is rotated up and down through the surface of the liquid mixture, means (7, 28) being designed to generate a higher pressure on the outside of the filter body than on the inside of the filter body, so that a fine fraction of the liquid mixture is forced through the filter material, while a cake of solid particles is deposited on the filter material and accompanies the latter up over the liquid mixture during rotation of the filter body, a cake-removal member (11, 31) being designed to take off a layer of the cake from the filter material above the liquid mixture, so that a liquid-permeable coating of solid particles is left on the filter material which is moved down into the liquid mixture during rotation of the filter body, a discharging member (12) for discharging the said removed cake layer from the arrangement, and means (13–17; 22, 23; 32, 34–38; 40–43) for spraying the filter material with jets of liquid above the liquid mixture for the purpose of removing the said coating of solid particles for renewal of the coating, characterized in that the said spraying means (13–17, 22, 23; 32, 34–38; 40–43) is designed to spray jets of liquid in at least one spray zone (18; 33; 41), through which a part of the wall (3, 25) of filter material passes upwards during rotation of the filter body (2, 24), so that the whole cake of coarse particles, including the said coating, is removed from the said wall part of filter material by the said jets of the liquid, when the spraying means is actuated during rotation of the filter body, characterized in that the hollow filter body consists of at least one annular disk (2) with two side walls (3) of filter material arranged at a distance from one another, which disk is coaxial to and rotatable about the said horizontal axle, the spraying means (13–17, 22, 23) being designed to spray jets of liquid towards that part of each side wall which is moved upwards during rotation of the disk.

16. An apparatus according to claim 15, characterized in that the spraying means comprises spraying members (15) for spraying each side wall (3) with jets of liquid is in the said spray zone (18), which spraying members are pivotable about a further horizontal axle situated radially outside the disk (2).

17. An apparatus according to claim 16, characterized in that the hollow rotor body consists of a number of disks (2), and that at least one of the spraying members (15) can be actuated independently of the remaining spraying members.

18. An apparatus according to claim 17, characterized in that the spraying means comprises a distribution pipe (13) for liquid arranged coaxially to the said further horizontal axle, spray pipes (14) connected between the distribution pipe and respective spraying members (15), and a drive member (16) designed to turn the distribution pipe about the said further horizontal axle, so that the spraying members are moved between the radially outer and inner limits of the side walls (3) of the disk (2).

19. An apparatus according to claim 18, characterized in that the distribution pipe (13) is provided with an inner partition wall (19) which divides the distribution pipe into a first section (20), which is designed to distribute liquid to some of the spraying members (15), and a second section (21), which is designed to distribute liquid to the remaining spraying members.

20. An apparatus according to any one of claims 15, 16, 17, 18 and 19, characterized in that the spray zone (18; 43; 41) is arranged in proximity to the surface of the liquid mixture.

21. An apparatus according to any one of claims 15, 16, 17, 18 and 19, characterized in that the spraying means (13–17, 22, 23; 32, 34–38; 40–43) is designed to direct the jets of liquid essentially downwards towards the filter material.

22. An apparatus according to any one of claims 15, 16, 17, 18 and 19, characterized in that the spraying means (13–17, 22, 23; 32, 34–38) is designed to continuously move the said spray zone (18; 33) essentially horizontally along the filter material during rotation of the filter body (2, 24).

23. An apparatus according to any one of claims 15, 16, 17, 18 and 19, characterized in that the spraying means (13–17, 22, 23; 32, 34–38) is designed to move the said spray zone (18; 33) in stages essentially horizontally along the filter material during rotation of the filter body.

* * * * *